United States Patent [19]

Short

[11] Patent Number: 5,147,122
[45] Date of Patent: Sep. 15, 1992

[54] TAPE STORAGE RACK

[75] Inventor: Michael K. Short, Archbold, Ohio

[73] Assignee: Sauder Woodworking Co., Archbold, Ohio

[21] Appl. No.: 685,509

[22] Filed: Apr. 15, 1991

[51] Int. Cl.$^5$ ............................................. A47B 88/00
[52] U.S. Cl. .................................. 312/321.5; 312/283
[58] Field of Search ............ 312/204, 283, 274, 321.5, 312/324, 326, 329

[56] References Cited

FOREIGN PATENT DOCUMENTS

| 0576115 | 8/1924 | France | 312/283 |
| 1059600 | 3/1954 | France | 312/324 |
| 0354050 | 11/1937 | Italy | 312/283 |

Primary Examiner—Joseph Falk
Assistant Examiner—Gerald Anderson
Attorney, Agent, or Firm—Allen D. Gutchess, Jr.

[57] ABSTRACT

An article of furniture includes provisions for the storage of tapes and the like. The article can be an entertainment center having a storage unit at one end or both ends, or it can be a free-standing, combined storage unit. The unit includes a stationary section having a back wall with a first, rear side wall and a second, front side wall extending outwardly from side edge portions of the back wall. A plurality of shelves extend between the side walls and outwardly from the back wall. The unit further includes a hinged, movable section having a movable back wall with a third, front side wall and a fourth side wall extending outwardly from side edge portions thereof. A plurality of additional shelves extend between the third and fourth side walls and outwardly from the movable back wall. Hinges connect an edge portion of the movable back wall and an outer edge of the rear side wall. The front side wall has a width at least equal to the depth of both the stationary shelves and the movable shelves so that the front side wall completely overlaps the stationary shelves when the movable section is closed and the back walls are in parallel relationship. The front side wall thus forms a decorative part of the front of the article of furniture and provides support for the shelves of the movable section.

20 Claims, 2 Drawing Sheets

TAPE STORAGE RACK

This invention relates to an article of furniture and specifically a storage unit for storing tapes and the like.

The storage unit can be embodied in one or both ends of an overall entertainment unit which also includes provisions for a television and provisions for stero components. The storage can be also embodied in a free-standing unit. The storage unit basically includes a stationary section and a movable, hinged section. The stationary section has a plurality of stationary shelves and the movable section has a plurality of shelves which are movable therewith. The stationary section has a back wall and a rear side wall which supports ends of the shelves and has a width at least equal to the combined depth of the stationary shelves and movable shelves. A back wall of the movable section is hinged to an edge portion of the rear side wall and a front side wall of the movable section is affixed to a forward edge of the movable back wall and supports ends of the shelves of the movable section. The front wall also has a width at least equal to the combined depth of the stationary and movable shelves. With this arrangement, the front wall covers both the stationary shelves and the movable shelves when the movable section is closed, to provide a decorative front door panel for the article of furniture.

The front wall thus serves as a decorative door for both sets of shelves, with the only vertical seam being at the outer edge of the front wall. There are no hinged joints at all the front of the article, there being only one hinged joint out of sight at the rear. A smoother, more pleasing appearance is thus achieved and with fewer components, in contrast to a seam and two hinged edges when two separate front doors are used. The front wall also serves as a structural wall for supporting ends of the plurality of shelves in the movable section.

It is, therefore, a principal object of the invention to provide a storage unit for tapes and the like having a stationary shelf section and a movable shelf section with the latter having a front panel which overlaps the stationary shelves when the movable section is closed, to provide a smoother appearance and to require fewer components.

Many other objects and advantages of the invention will be apparent from the following detailed description of preferred embodiments thereof, reference being made to the accompanying drawings, in which.

Figure 1:
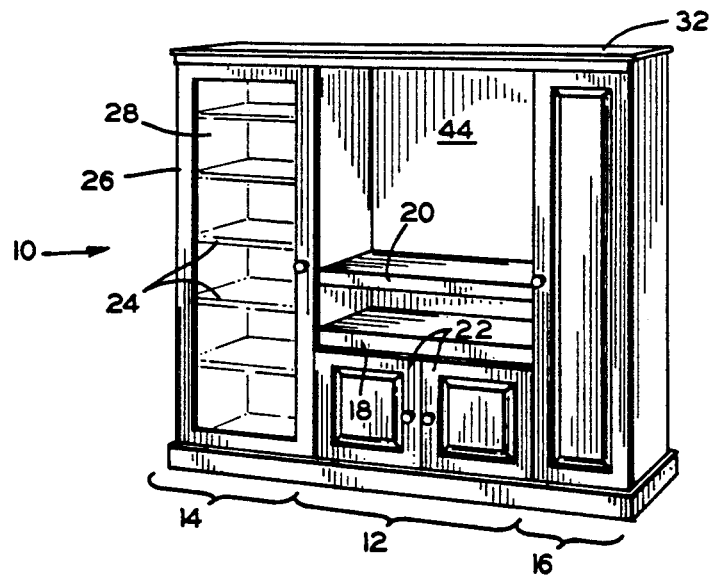
FIG. 1 is a view in perspective of an entertainment center having a storage unit at one end embodying the invention.

Referring to FIG. 1, an article of furniture 10 is shown in the form of an entertainment center. The center includes a central television unit 12, a left end sound unit 14, and a right end storage unit 16. The central television unit 12 has a fixed shelf 18, an adjustable shelf 20, and lower doors 22 which close off a storage space therebehind. The sound unit 14 has a plurality of shelves 24, one of which can be pulled out to accommodate a turntable, if desired. A door 26 extends across the unit 14 and has a glass panel 28. The three units 12–16 have a common bottom panel 30 (FIG. 2) and a common top panel 32.

The storage unit 16, embodying the invention, includes a stationary section 34 and a hinged, movable section 36. The stationary section 34 has an upright, stationary back panel or wall 38 which also separates the storage unit 16 from the television unit 12 and is affixed to the bottom and top panels 30 and 32 by suitable fasteners (not shown). The stationary section 34 further includes a rear side panel or wall 40, which is also affixed to the bottom and top panels, and to a rear edge of the back panel 38 by suitable fasteners 42. A thin back panel 44 extends across both of the sections 12 and 14. A forward side panel or wall 46 is parallel to the rear side panel 40 and is also affixed to the bottom and top panels 30 and 32 and to a forward edge portion of the back panel 38 by suitable fasteners 48. The edge portion of the back panel 38 preferably extends beyond the forward side panel 46. A plurality of stationary shelves 50, five in this instance, extend between the rear side panel 40 and the forward side panel 46, being connected thereto by pins 52.

The hinged, movable storage section 36 includes a movable back panel or wall 54 which also constitutes a right end panel for the entertainment center 10, in this instance. The section 36 further includes a front or door side panel or wall 56 which has a right hand edge affixed to a forward edge of the back panel 50 by suitable fasteners 58. The movable section 36 also includes a movable rear side panel or wall 60 which has an edge affixed to a rear edge portion of the movable back panel 54 by suitable fasteners 62, with the rear edge portion of the back panel 54 extending beyond the panel 60. A plurality of movable shelves 64, there being five in this instance, extend between the front panel 56 and the rear side panel 60, being suitable affixed thereto by pins 66 and hidden fasteners 68.

The rear edge portion of the back panel 54 is pivotally connected to the rear side panel 40 of the stationary section 34 by four hinges 70. These enable the movable section 36 to pivot outwardly and away from the stationary section 34 when a knob 72 on the front panel 56 is pulled outwardly, thereby exposing the stationary shelves 50 and the shelves 64 of the movable section 36 for ready access. The shelves are of a suitable size and spaced apart a suitable distance to accommodate tapes, such as video tapes and/or audio tapes and compact discs, by way of example.

As shown, the stationary shelves 50 and the movable shelves 64 are of substantially the same length and depth. However, these may vary in size and number. In any event, the width of the stationary back panel 38 preferably exceeds the length of the shelves 50 so that the forward edge of the back panel protrudes beyond the forward side panel 46. The side panel 46 preferably has a width approximately equalling the depth of the shelves 50. The width of the upright stationary rear panel 40 preferably at least equals and preferably exceeds the combined depth of the shelves 50 and 64.

The movable back panel 54 preferably has a width exceeding the length of the shelves 64 so as to extend beyond the movable rear side panel 60 to accommodate the hinges 70. The side panel 60 preferably has a width approximately equal to the depth of the shelves 64. The front panel 56 has a width at least equalling and preferably exceeding the combined depth of the shelves 50 and 64, and preferably about equals the width of the rear panel 40.

With some designs, depending on the fasteners or brackets employed, the shelves 50 can be affixed to the back panel 38 and to the rear panel 40 and the shelves 64 can be similarly affixed to the movable back panel 54 and to the front panel 56 with the side panels 46 and 60 being eliminated.

Figure 2:
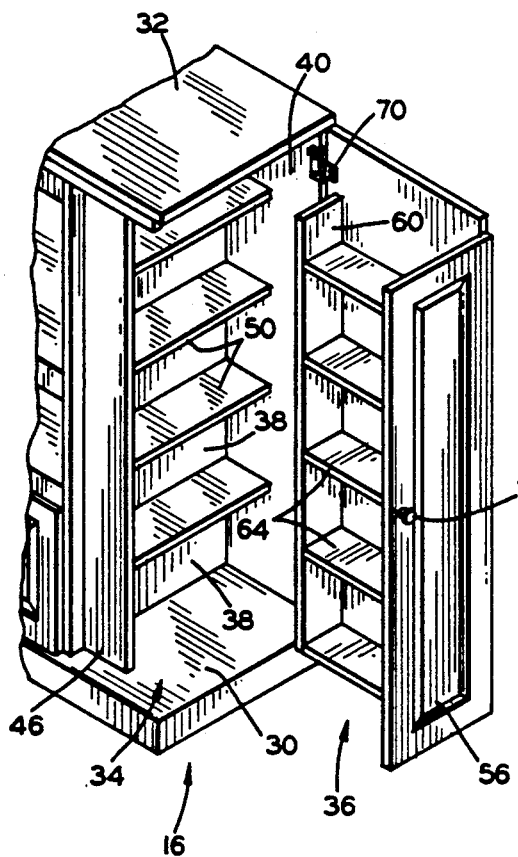
FIG. 2 is an enlarged, fragmentary view in perspective of the storage unit of FIG. 1, shown in an open position.
Figure 3:
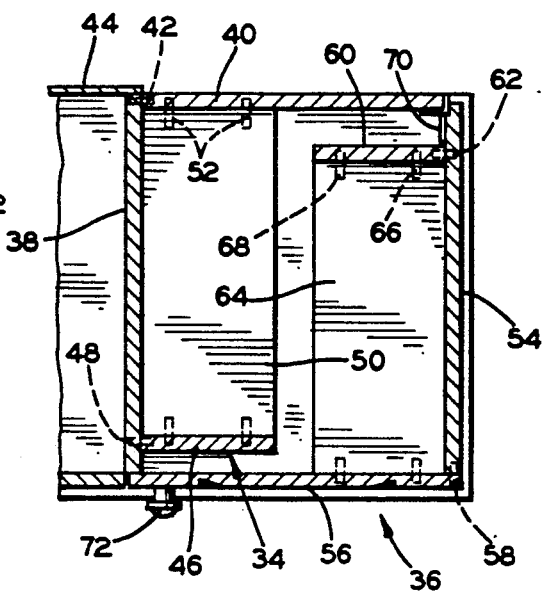
FIG. 3 is a fragmentary view in horizontal cross section taken through the storage unit of FIG. 2.

When the movable section 36 is open, as shown in FIG. 2, both sets of the shelves 50 and 64 are readily accessible. When the movable section 36 is closed, as shown in FIG. 3, the front panel 56 covers both sets of shelves and forms a part of the decorative front of the entertainment center 10, also being parallel to the back panel 40. Similarly, the end panel 54 forms a decorative end of the entertainment center and is parallel to the back panel 38 in the closed position.

Figure 4:
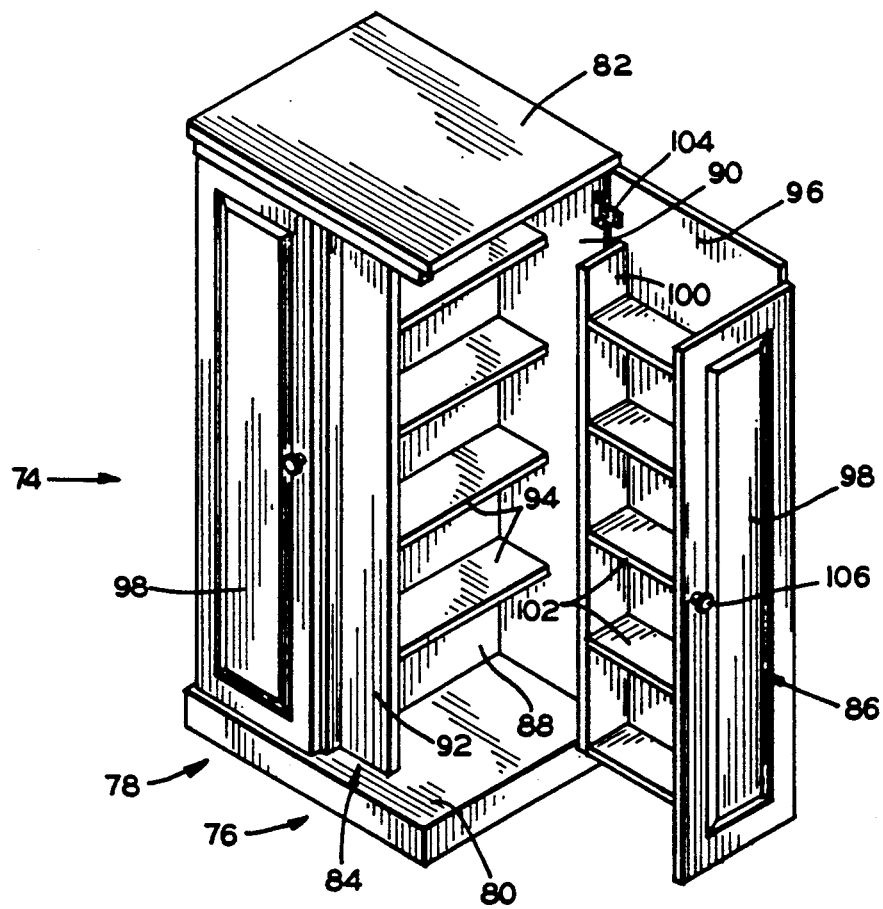
FIG. 4 is a view in perspective of a free-standing, combined storage unit embodying the invention.
Figure 5:
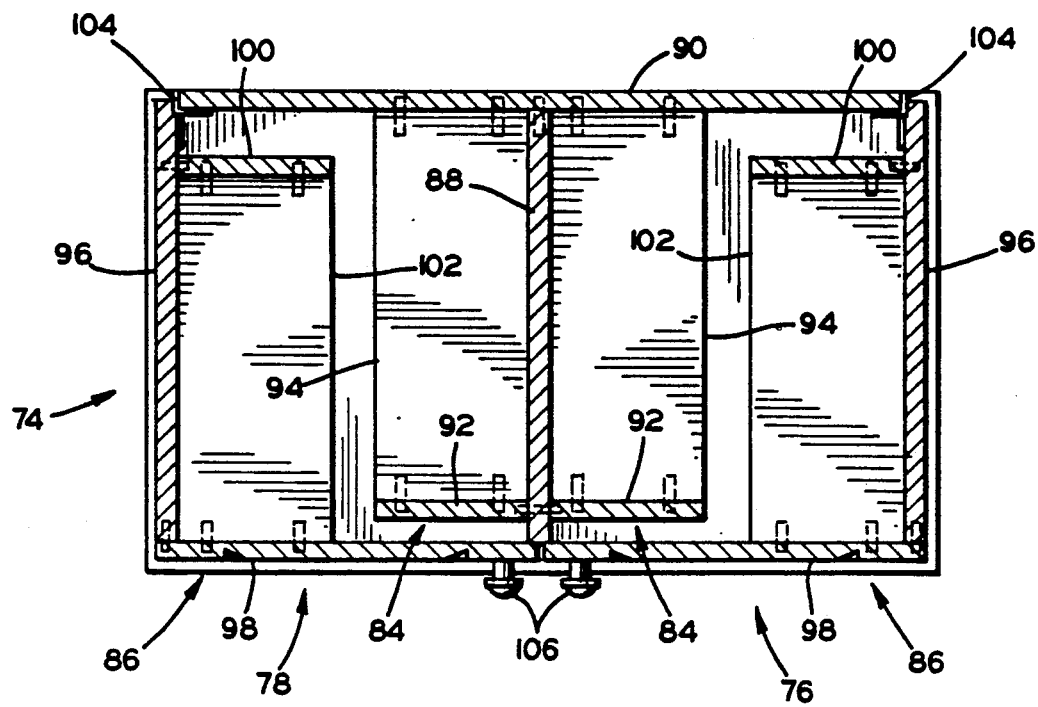
FIG. 5 is a view in horizontal cross section taken through the combined storage unit of FIG. 4.

Referring to FIGS. 4 and 5, an article of furniture 74 is shown in the form of combined free-standing storage units 76 and 78 embodying the invention. The combined units have a common bottom panel 80 (FIG. 4) and a common top panel 82.

Each of the storage units 76 and 78 includes a stationary section 84 and a hinged, movable section 86. The stationary sections 84 have a common stationary back panel or wall 88 which also separates the two storage units and is affixed transversely across the bottom and top panels 80 and 82 by suitable fasteners (not shown). The stationary sections 84 also have a common rear side panel or wall 90 which is affixed to the bottom and top panels and to a rear edge of the back panel 88. Each of the sections 84 also has a forward side panel or wall 92 which is parallel to the common rear side panel 90 and can also be affixed to the bottom and top panels 80 and 82, as well as to a forward edge portion of the common back panel 88. The forward edge portion of the back panel 88 preferably extends beyond the forward side panels 92. A plurality of stationary shelves 94 extend between the rear side panel 90 and the forward side panel 92 for each of the stationary sections 84.

Each of the hinged, movable storage sections 86 includes a movable back panel or wall 96 which constitutes an end panel for the article of furniture 74. Each of the sections 86 also includes a front door panel or wall 98 which has an end edge affixed to a forward edge of the panel 96. Each of the movable sections 86 further has a movable rear side panel or wall 100 which has an edge affixed to a rear edge portion of the back panel 96 with the rear edge portion of the panel 96 extending beyond the panel 100. A plurality of shelves 102 of each of the movable sections 86 extend between the front panel 98 and the rear side panel 100.

The rear edge portion of the back panel 96 is connected to an edge of the rear side panel 90 by four hinges 104. These enable the movable sections 86 to pivot outwardly and away from the stationary sections 84 when knobs 106 on the front panels 98 are pulled outwardly, thereby exposing both the stationary shelves 94 and the movable shelves 102 for full access.

The portion of the stationary rear panel 90 for each of the units 76 and 78 has a width exceeding the combined depth of the shelves 94 and 102. Similarly, each of the front panels 98 has a width exceeding the combined depth of the shelves 94 and 102.

When the movable sections 86 are open, both of the sets of shelves are readily accessible. When the movable sections are closed, as shown in FIG. 5, each of the front panels 98 covers both sets of shelves for the respective storage unit and the two panels, in combination, form the decorative front of the article of furniture 74. Similarly, the end panels 96 form decorative ends for the article of furniture. The hinges 104 are out of sight at the rear of the article 74 and there is only one seam at the front. As is true of the front panel 56, the front panels 98 also provide support for the shelves 102.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. An article of furniture comprising a stationary back wall, first and second upright side walls extending outwardly from said back wall in spaced relationship, a plurality of stationary shelves of predetermined depth extending between said side walls and outwardly from said back walls, a movable back wall, third and fourth upright side walls extending outwardly from said movable back wall in spaced relationship, a plurality of movable shelves of predetermined depth extending between said third and fourth side walls and outwardly from said movable back wall, hinge means connecting said movable back wall and said first side wall, said fourth upright side wall having a width at least equal to the depth of both said stationary shelves and said movable shelves, said fourth upright side wall completely overlapping said second side wall when said back walls are in parallel relationship, with the article in a closed condition.

2. An article of furniture according to claim 1 wherein ends of said movable shelves are connected to said fourth upright side wall for structural support.

3. An article of furniture according to claim 2 wherein ends of said stationary shelves are connected to said first side wall for structural support.

4. An article of furniture according to claim 1 wherein ends of said stationary shelves are connected to said first side wall for structural support.

5. An article of furniture according to claim 1 wherein said first side wall and said fourth side wall are of approximately equal width.

6. An article of furniture comprising a stationary back wall, a first upright side wall extending outwardly from said back wall, a plurality of stationary shelves having ends adjacent said first side wall and extending outwardly from said back wall, a movable back wall, a plurality of movable shelves extending outwardly from said movable back wall, means connecting said movable back wall and said first upright side wall to enable said movable back wall to pivot relative to said stationary back wall, a wide upright side wall extending outwardly from said movable back wall, said wide upright side wall having a width at least equal to the depth of said stationary shelves and said movable shelves, said wide side wall extending substantially to said stationary back wall when said back walls are in parallel relationship, with the article in a closed condition.

7. An article of furniture according to claim 6 wherein a second upright side wall extends outwardly from said stationary back wall adjacent other ends of said stationary shelves.

8. An article of furniture according to claim 7 wherein a third upright side wall extends outwardly from said movable back wall adjacent ends of said movable shelves.

9. An article of furniture according to claim 6 wherein a second upright side wall extends outwardly from said movable back wall adjacent ends of said movable shelves.

10. An article of furniture according to claim 6 wherein ends of said movable shelves are connected to said wide upright side wall for structural support.

11. An article of furniture according to claim 10 wherein ends of said stationary shelves are connected to said first upright side wall for structural support.

12. An article of furniture according to claim 6 wherein ends of said stationary shelves are connected to said first upright side wall for structural support.

13. An article of furniture according to claim 6 wherein said first upright side wall and said wide upright side wall are approximately equal in width.

14. An entertainment center comprising a television unit, a sound unit, and a storage unit at one end of said entertainment center, said center having a common bottom panel and a common top panel extending over all three units, said storage unit comprising a stationary back wall extending transversely of said bottom and top panels and affixed thereto, a first upright side wall extending outwardly from said back wall and affixed thereto, a plurality of stationary shelves having ends adjacent said side wall and extending outwardly from said back wall, a movable back wall, a plurality of movable shelves extending outwardly from said movable back wall, hinge means connecting said movable back wall and said first upright side wall to enable said movable back wall to pivot relative to said stationary back wall, a front upright side wall extending outwardly from said movable back wall, said front side wall having a width at least equal to the depth of said stationary shelves and said movable shelves, said front side wall completely overlapping ends of said stationary shelves when said back walls are in parallel relationship, in a closed condition, and forming part of a decorative front of said entertainment center.

15. An entertainment center according to claim 14 wherein ends of said movable shelves are connected to said front upright side wall for structural support.

16. An entertainment center according to claim 14 wherein ends of said stationary shelves are connected to said first upright side wall for structural support.

17. An entertainment center according to claim 14 wherein said first upright side wall and said front upright side wall are of approximately equal width.

18. Combined storage units for tapes and the like, said units comprising a bottom panel, a top panel, a stationary back wall extending between said bottom and top panels and affixed thereto, first, rear side wall means extending outwardly in both directions from a rear edge of said back wall and affixed thereto, a first plurality of stationary shelves having ends adjacent said side wall means and extending outwardly from one side of said back wall, a second plurality of stationary shelves having ends adjacent said side wall and extending outwardly from the other side of said back wall, a first movable back wall, a first plurality of movable shelves extending outwardly from said first movable back wall, first hinge means connecting said movable back wall and said rear side wall means to enable said movable back wall to pivot relative to said stationary back wall, a first front side wall extending outwardly from said first movable back wall, said first front side wall having a width at least equal to the depth of said first plurality of stationary shelves and said first plurality of movable shelves, said front side wall completely overlapping ends of said first plurality of stationary shelves when said stationary back wall and said first movable back wall are in parallel relationship and forming a substantial part of a decorative front of said combined storage units, a second movable back wall, a second plurality of movable shelves extending outwardly from said second movable back wall, second hinge means connecting said second movable back wall and said rear side wall means to enable said second movable back wall to pivot relative to said stationary back wall, a second front side wall extending outwardly from said second movable back wall, said second front side wall having a width at least equal to the depth of said second plurality of stationary shelves and said second plurality of movable shelves, said second front side wall completely overlapping ends of said second plurality of stationary shelves when said second movable back wall and said stationary back wall are in parallel relationship and forming a substantial part of a decorative front of said combined storage units, said first and second movable back walls being parallel to said stationary back wall when the units are in closed conditions.

19. Combined storage units according to claim 18 wherein said first front side wall and said second front side wall are of substantially equal width.

20. Combined storage units according to claim 18 wherein each of said first and second front side walls form substantially one-half of the decorative front of said combined storage units.

* * * * *